(12) United States Patent
Brechbühl et al.

(10) Patent No.: US 10,168,242 B2
(45) Date of Patent: Jan. 1, 2019

(54) GLOW-PLUG ADAPTOR FOR PRESSURE MEASUREMENTS

(71) Applicant: KISTLER HOLDING AG, Winterthur (CH)

(72) Inventors: Stefan Brechbühl, Weinfelden (CH); Simon Brunner, Efretikon (CH)

(73) Assignee: Kistler Holding AG, Winterthur (CH)

( * ) Notice: Subject to any disclaimer, the term of this patent is extended or adjusted under 35 U.S.C. 154(b) by 225 days.

(21) Appl. No.: 15/119,785

(22) PCT Filed: Feb. 13, 2015

(86) PCT No.: PCT/CH2015/000019
§ 371 (c)(1),
(2) Date: Aug. 18, 2016

(87) PCT Pub. No.: WO2015/127568
PCT Pub. Date: Sep. 3, 2015

(65) Prior Publication Data
US 2017/0067793 A1    Mar. 9, 2017

(30) Foreign Application Priority Data
Feb. 25, 2014  (CH) ...................................... 0264/14

(51) Int. Cl.
*F23Q 7/00* (2006.01)
*G01L 9/00* (2006.01)
(Continued)

(52) U.S. Cl.
CPC .......... *G01L 19/0681* (2013.01); *F23Q 7/001* (2013.01); *G01L 9/008* (2013.01);
(Continued)

(58) Field of Classification Search
CPC ............... F23Q 2007/002; G01L 9/008; G01L 9/08–9/085; G01L 23/222;
(Continued)

(56) References Cited

U.S. PATENT DOCUMENTS 5,488,868 A * 2/1996 Ootake ................. G01L 9/0052
310/338
5,583,295 A * 12/1996 Nagase ................. G01L 9/0052
73/114.18
(Continued)

FOREIGN PATENT DOCUMENTS

DE    10 2011 088 474 A1    6/2013
EP    1 111 360 A2           6/2001
(Continued)

OTHER PUBLICATIONS

Machine Translation of International Search Report, dated Apr. 15, 2015.*
(Continued)

*Primary Examiner* — Daniel S Larkin
*Assistant Examiner* — David L Singer
(74) *Attorney, Agent, or Firm* — Dority & Manning, P.A.

(57) ABSTRACT

A glow plug adaptor for pressure measurement in a combustion chamber of an internal combustion engine includes an adaptor sleeve attached to an adaptor head that contains a pressure sensor with a diaphragm. A sealing shoulder can be screwed into an opening in a combustion chamber to provide a pressure-tight seal and permit passage of signal conductors from the pressure sensor through the adaptor sleeve. The adaptor head is tapered at the proximal combustion chamber end, and in the adaptor head a cavity is formed in such a way that the cavity is bounded by the diaphragm of the pressure sensor mounted therein and by a closed end wall of the adaptor head.

8 Claims, 2 Drawing Sheets

(51) Int. Cl.
  *G01L 19/06* (2006.01)
  *G01L 23/10* (2006.01)
  *G01L 23/22* (2006.01)
(52) U.S. Cl.
  CPC ............ *G01L 23/10* (2013.01); *G01L 23/22* (2013.01); *F23Q 2007/002* (2013.01)
(58) Field of Classification Search
  CPC ............ G01L 19/0681; G01L 19/0609; G01L 19/149; G01L 19/04; F02P 19/028; G01M 15/08; G01D 11/245
  USPC .......... 73/114.19, 114.16, 35.12, 35.13, 708, 73/715, 723–727, 756, 431
  See application file for complete search history.

(56) References Cited

U.S. PATENT DOCUMENTS

| | | | |
|---|---|---|---|
| 7,752,915 | B2 | 7/2010 | Holzheu |
| 8,205,490 | B2 | 6/2012 | Müeller |
| 2004/0237629 | A1 | 12/2004 | Lenzing et al. |
| 2009/0025482 | A1 | 1/2009 | Holzheu |
| 2010/0147057 | A1* | 6/2010 | Mayrhofer .............. G01L 23/00 73/114.16 |
| 2013/0319094 | A1* | 12/2013 | Nakamura ............. G01M 15/08 73/114.19 |
| 2014/0130585 | A1* | 5/2014 | Borgers ................ G01M 15/08 73/114.18 |

FOREIGN PATENT DOCUMENTS

| | | | |
|---|---|---|---|
| EP | 2 023 113 A2 | 2/2009 | |
| GB | 2217846 A | * 11/1989 | ......... G01L 19/0645 |
| GB | 2500215 A | * 9/2013 | ........... F02D 41/222 |
| WO | WO 2009/146565 A1 | 12/2009 | |

OTHER PUBLICATIONS

Sirohi et al, Fundamental Understanding of Piezoelectric Strain Sensors, Journal of Intelligent Material Systems and Structures, vol. 11—Apr. 2000.*

International Search Report, dated Apr. 15, 2015.

* cited by examiner

GLOW-PLUG ADAPTOR FOR PRESSURE MEASUREMENTS

CROSS-REFERENCE TO RELATED APPLICATIONS

This application claims priority to International Application Ser. No. PCT/CH2015/000019, filed Feb. 13, 2015, which claims priority to Swiss Application No. 00264114, filed Feb. 25, 2014. International Application Ser. No. PCT/CH2015/000019 is hereby incorporated herein in its entirety for all purposes by this reference.

FIELD OF THE INVENTION

The invention relates to a glow-plug adaptor for pressure measurement in a combustion chamber of an internal combustion engine and includes an adaptor head, in which a pressure sensor with a diaphragm is mounted, and an adaptor sleeve which is attached to the adaptor head. The invention also relates to a glow-plug adaptor which is arranged in a pressure-tight manner in a glow-plug socket in the combustion chamber wall.

BACKGROUND

Adaptors for fitting pressure measuring probes to internal combustion engines are produced and distributed as ignition or glow-plug adaptors, the geometry of the glow-plug adaptor typically corresponding to a glow-plug. To adapt the glow-plug adaptor to the required geometry, glow-plug adaptors known from the prior art include adaptor tips, as is known in the case of glow-plug adaptors.

DE 102011088474 describes a glow-plug adaptor which has a metallic or ceramic adaptor tip, which is mounted on the combustion chamber upstream of a piezoelectric pressure sensor. The pressure acting on the glow pin is transferred to the pressure sensor and thereby measured.

A similar structure is described in U.S. Pat. No. 8,205,490, which is hereby incorporated herein by this reference for all purposes. Forces or pressures acting in the longitudinal direction on an adaptor tip of the glow-plug adaptor are transferred to a diaphragm of a piezoelectric sensor and measured. The adaptor tip is accordingly movably mounted and acts in each case as a pressure absorbing element, so that forces are indirectly transferred via the adaptor tip onto the diaphragm of the piezo-electric sensor. The measuring accuracy achievable by these arrangements is less than optimal, due to the indirect force transmission.

A different design is described in the glow-plug adaptor in accordance with DE 20301021. This glow-plug adaptor can also be fixed instead of a glow-plug in a glow-plug socket in a combustion chamber wall. The glow-plug adaptor has an adaptor head, which is substantially cylindrical in design, has a sealing cone and can be fixed in the glow-plug socket forming a sealing seat. The pressure sensor is embodied as a non-cooled high-temperature pressure sensor, comprising a movable diaphragm which is directly acted on by the gas pressure of the combustion chamber. The diaphragm is mounted as close as possible to the combustion chamber, which increases the measuring accuracy.

The adaptor head of the glow-plug adaptor has an adaptor tip attached thereto, to simulate as accurately as possible the shape of the tip of a glow-plug. The adaptor tip is modelled on the contour of the tip of the glow-plug and is permanently fixed to the adaptor head at the combustion chamber-facing end of the glow-plug adaptor by a materially bonded connection. An adaptor tip is understood to mean a rigid device which is fixed to the adaptor head at the combustion chamber-facing end and is connected upstream of the pressure sensor on the combustion chamber side. In the installed condition the adaptor tip protrudes into the combustion chamber, analogously to the arrangement of a glow-plug. In the adaptor tip a plurality of gas exchange channels are provided, which lead into a cavity in front of the diaphragm of the pressure sensor. Since only a small gap remains in the narrow glow-plug openings between the adaptor tip and the combustion chamber wall, the heat inflow to the combustion chamber is restricted.

Depending on how far the adaptor tip protrudes into the combustion chamber, high temperatures and large temperature drops occur at the pressure sensor of the adaptor, which negatively affect both the measurement accuracy and the service life of the pressure sensor. The thermal convection around the body of the adaptor tip and in the large gap between the adaptor tip and the inner wall of the glow-plug socket results in a strong heating of the adaptor tip. To prevent a strong heating, attempts have been made to design the gap to be as small as possible.

BRIEF SUMMARY OF THE INVENTION

The object of the present invention is to describe a glow-plug adaptor described above for measuring pressure in the combustion chamber of internal combustion engines, in particular of diesel engines, that achieves a higher measuring accuracy with a higher service life of a pressure sensor arranged therein.

As the prior art shows, it was assumed that a glow-plug adaptor must have an adaptor tip in order to keep the gas flow inside the combustion chamber during the pressure measurement as equal as possible to that found if a glow plug had originally been used. This has surprisingly turned out to be unnecessary. By omitting an adaptor tip, the pressure sensor can be brought closer to the combustion chamber, which makes the pressure measurement more accurate. As measurements have shown, the thermal load is surprisingly not increased when the adaptor tip is omitted. Due to the shortening of the adaptor head, the glow-plug adaptor can be fully fitted into the socket of the combustion chamber wall without protruding into the combustion chamber. This also enables measurements with reduced thermal problems.

When highly temperature-stable pressure sensors are used, the glow-plug adaptors are therefore simpler in design. They are not subject to higher thermal loads, deliver improved pressure measurements and are simpler and more cost-effective to produce.

BRIEF DESCRIPTION OF THE DRAWINGS

Below, the invention is described in more detail by reference to the drawings. They show:

FIG. 2b a detailed view of a section through a part of the adaptor head of the glow-plug adaptor in accordance with FIG. 2a;

DESCRIPTION OF EXEMPLARY EMBODIMENTS OF THE INVENTION

Figure 1:
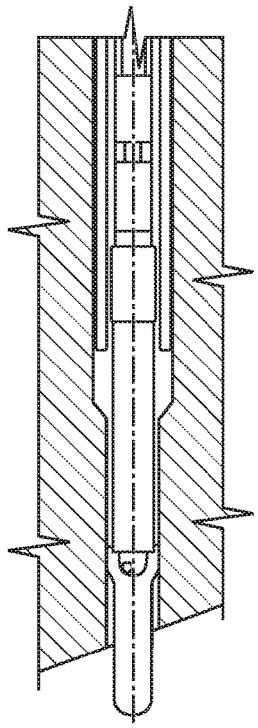
FIG. 1 a glow-plug adaptor in accordance with the prior art, with an adaptor tip on the adaptor head.
Figure 2A:
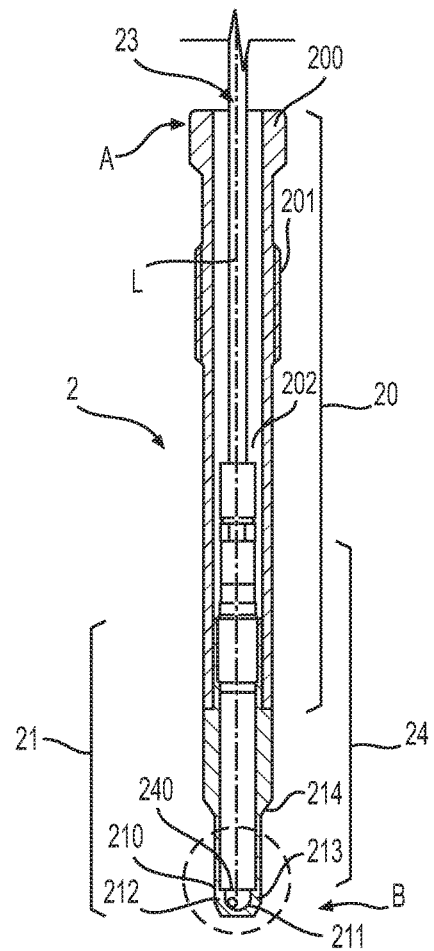
FIG. 2a a sectional view of an adaptor tip-free glow-plug adaptor according to the invention.
Figure 3:
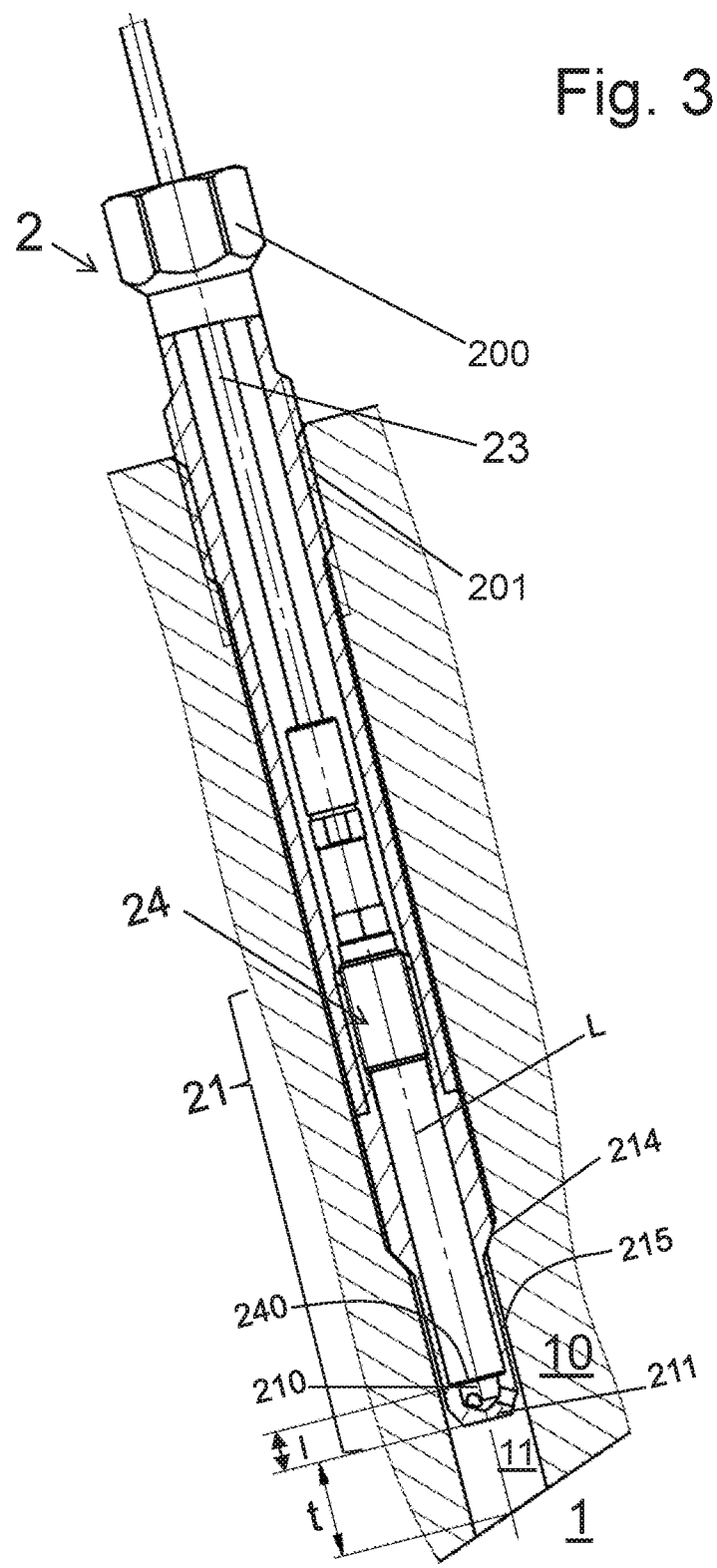
FIG. 3 a partial section of an adaptor-tip free glow-plug adaptor according to the invention, inserted and fixed in a glow-plug socket of a combustion chamber wall.

A glow-plug adaptor 2 according to the invention is shown in FIG. 2a in isolation and in a sectional view. The entire contour of the glow-plug adaptor 2 has a generally cylindrical shape and, apart from the tip, is modelled to match a glow-plug. The glow-plug adaptor 2 comprises a hollow adaptor sleeve 20 and an adaptor head 21, wherein the adaptor head 21 is welded to the adaptor sleeve 20. Adaptor head 21 and adaptor sleeve 20 can also be screwed, crimped or glued together, however. The glow-plug adaptor 2 extends from a distal combustion chamber end A to a proximal combustion chamber end B along a longitudinal axis L. The distal combustion chamber end A here has the shape of a hexagonal screw head 200. As shown in FIG. 2a for example, along a section of the external surface of the adaptor sleeve 20, an external thread 201 is arranged. Using a tool which engages with the hexagonal screw head 200, the glow-plug adaptor 2 can be attached by means of a detachable connection of the external thread 201 in an operatively connectable internal thread, as is shown in FIG. 3. The adaptor head 21 is located in the area of the proximal combustion chamber end B of the glow-plug adaptor 2.

Through an interior space 202 of the adaptor sleeve 20, signal conductors 23 extend to a pressure sensor 24. The pressure sensor 24 is configured so as to be non-cooled, and in addition to other components comprises a diaphragm 240 and a measuring element which is operatively connected to the diaphragm 240, wherein to obtain the best measurement accuracy the measuring element connected to the diaphragm 240 should be arranged as closely as possible to the diaphragm 240. In the best case the measuring element is in direct contact with the diaphragm 240. The pressure sensor 24 is usually designed as a cylindrical pressure sensor and extends into an adaptor head interior, not shown.

Figure 2B:
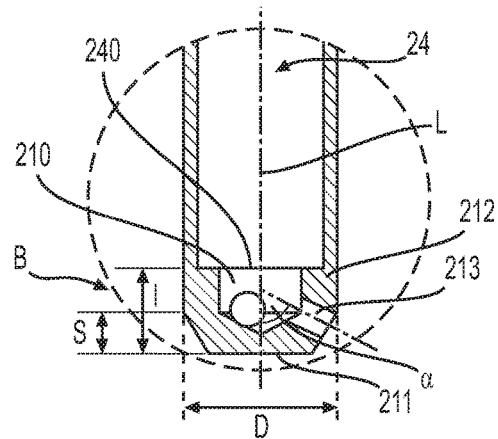

The pressure sensor 24 protrudes at least partly into the adaptor head interior of the adaptor head 21. The adaptor head 21 is preferably integrally designed, comprises a sealing shoulder 214 defined in an external surface of the adaptor head 21 and is tapered in the direction of the proximal combustion chamber end B, and thus in the combustion chamber-side area of the adaptor head 21. The side walls 212 of the adaptor head 21 are preferably designed in the shape of a frustum in the combustion chamber-side area of the adaptor head 21, wherein the hollow interior of the adaptor head 21 is terminated by an end wall 211. The end wall 211 is planar and extends in a plane perpendicular to the longitudinal axis L. An internal surface defines part of a cavity 210 that is formed in the interior of the adaptor head 21. As shown in FIG. 2b for example, the cavity 210 is terminated at the proximal combustion chamber end B by the end wall 211 and in the direction of the interior of the adaptor head by the diaphragm 240 of the pressure sensor 24.

The adaptor head 21 has an internal thread, which can be operatively connected to an external thread of the sensor 24. The adaptor head 21 is permanently materially bonded to the adaptor sleeve 20.

In the detailed view of the proximal combustion chamber end B of the glow-plug adaptor 2, or the adaptor head 21 according to FIG. 2b, the features of the adaptor head 21 are highlighted. Into the side walls 212 as far as the cavity 210, a plurality of gas exchange channels 213 are transversely recessed, which here extend at an angle α between 30° and 90°, preferably of approximately 60°, to the longitudinal axis L. Here, three gas exchange channels 213 are provided, which lead into the cavity 210. The end wall thickness, which is designated by the letter s in FIG. 2b and measured along the longitudinal axis L, is less than or equal to 3 mm. Thus, the adaptor head 21 only has a low surface area at its tip, which only supplies a low heat input. In particular, no adaptor tip is formed on or permanently fixed to the adaptor head 21, which highly surprisingly, in accordance with the present invention has been identified as unnecessary.

The front height, which is designated by the letter I in FIG. 2b and measured along the longitudinal axis L from the surface terminated by the diaphragm 240 as far as the outer surface of the end wall 211, is less than one adaptor diameter D of the adaptor head 21 in the area of the cavity 210.

As shown in FIG. 3 for example, the glow-plug adaptor 2 is introduced in place of a glow-plug into a glow-plug socket 11 in a combustion chamber wall 10 of a combustion chamber 1 of an internal combustion engine, for example a diesel engine. The proximal combustion chamber end B of the glow-plug adaptor 2 is also inserted far enough into the glow-plug socket 11 that the adaptor head 21 comes to rest completely within the glow-plug socket 11. The glow-plug socket 11 is designed in such a way that a tapered section of the diameter is formed on the side facing towards the combustion chamber 1. The sealing shoulder 214 of the adaptor head 21 is placed in contact with this tapered section in the glow plug socket 11, whereby a gas-tight fixing of the glow-plug adaptor 2 in the glow-plug socket 11 is obtained. The external thread 201 on the adaptor sleeve 20 engages in an internal thread of the glow-plug socket 11, which is arranged in a section facing away from the combustion chamber 1. The adaptor sleeve 20 together with adaptor head 21 can be screwed in so as to connect it in a detachable manner by actuating the hexagonal screw head 200. The signal conductors 23 emerge from the adaptor sleeve 20 outside of the glow-plug socket 11 and can be connected to a measuring device.

The geometry of the glow-plug adaptor 2 is adapted to the glow-plug socket 11 in such a way that the adaptor head 21 does not protrude into the combustion chamber 1.

The proximal combustion chamber end B of the glow-plug adaptor 2, in particular the adaptor head 21 with the end wall 211, the cavity 210 and the gas exchange channels 213, are situated entirely within the glow-plug socket 11 and spaced apart from the combustion chamber 1. The glow-plug adaptor 2 is thus recessed in the glow-plug socket 11 so that the adaptor head 21 does not protrude into the combustion chamber 1. As shown in FIG. 3 for example, the recess distance measured along the longitudinal axis between a central point at the location of the longitudinal axis L on the outer surface of the end wall 211 and the chamber opening at the open end of the glow-plug socket 11 is designated by the letter t and therefore chosen to be greater than or equal to zero. The recess distance t is preferably chosen to be greater than zero and less than 10 mm, which gives the best measurement results.

It is advantageous if the annular gap 215 between the side walls 212 of the adaptor head 21 and the inner wall of the glow-plug socket 11 has a small gap size. The adaptor head 21 is preferably shaped such that the annular gap size is less than 0.05 mm.

Firstly, the end wall 211 is closed and the adaptor head 21 is recessed in the glow-plug socket 11 of the combustion chamber 1. The combustion gases can easily reach the diaphragm 240 through the gas exchange channels 213 however, at which the current gas pressure can be accurately measured by means of a measuring element. In order not to corrupt the measurement result, the recess distance t can only be varied within a small range. The free volume in the glow-plug socket 11 in front of the adaptor head 21 is greatly increased compared to the prior art. In the embodiment of the solution according to the invention, the gas flow reaches the gas exchange channels 213 more rapidly, or more easily, resulting in a higher measuring accuracy and service life of the pressure sensor 24.

The reduced surface area of the adaptor head 21 of the glow-plug adaptor 2 in comparison to the prior art leads to a lower heat input into the pressure sensor 24, which results in the increased service life.

It was not to be expected that elongated adaptor tips could be dispensed with. The flow properties are barely affected when using the glow-plug adaptor 2 according to the invention, and whistling vibrations are significantly reduced. In contrast to the prior art, the cross sectional area of the glow-plug socket 11 is not constricted by additional components. A larger flow of gas can therefore pass through the glow-plug socket, which avoids lower resonance frequencies with higher amplitudes.

LIST OF REFERENCES NUMERALS

1 Combustion chamber
10 Combustion chamber wall
11 Glow-plug socket
2 Glow-plug adaptor
20 Adaptor sleeve
200 Hexagonal screw head
201 External thread
202 Sleeve interior
21 Adaptor head
210 Cavity
I Front height
D Adaptor head diameter in the area of the cavity
211 End wall
s End wall thickness
212 Side wall
213 Gas exchange channel
214 Sealing shoulder/sealing cone
215 Gap
Adaptor head interior
23 Signal conductor
24 High-temperature pressure sensor (cylinder pressure sensor, non-cooled)
240 Diaphragm
L Longitudinal axis
A distal combustion chamber end
B proximal combustion chamber end
t distance between a central point at the height of the longitudinal axis L on the outside surface of the end wall 211 and the end of the glow-plug socket 11

The invention claimed is:

1. A pressure measurement apparatus for measuring pressure within the interior of a combustion chamber of an internal combustion engine, the apparatus comprising:
a chamber wall defining the combustion chamber, the chamber wall further defining a hollow glow-plug socket that is open at both opposite ends thereof and communicating with the interior of the combustion chamber via a chamber opening at one of the open opposite ends of the glow-plug socket; and
a glow-plug adaptor disposed in a pressure-tight manner in the glow plug socket, the glow plug adaptor including:
an adaptor head elongating along a longitudinal axis and defining a proximal combustion chamber end and a distal combustion chamber end disposed opposite the proximal combustion chamber end of the adaptor head, the adaptor head defining an external surface with a sealing shoulder disposed between the proximal combustion chamber end and the distal combustion chamber end and configured for forming a pressure-tight seal upon contacting an opposing surface of the socket, the proximal combustion chamber end defining a tapered external surface and an internal surface that defines part of a cavity;
a pressure sensor including a diaphragm and signal conductors, the pressure sensor being mounted in the adaptor head with the diaphragm defining one opposite end of the cavity;
a hollow adaptor sleeve elongating along the longitudinal axis and attached to the distal combustion chamber end of the adaptor head and receiving the signal conductors passing through the adaptor sleeve, which defines an external surface that is configured for being screwed into the glow-plug socket so as to dispose the sealing shoulder of the adaptor head in a pressure-tight engagement with the socket while disposing the signal conductors extending from one of the opposite ends of the socket;
wherein opposite the diaphragm the cavity is defined by a closed end wall that defines a flat external surface that is perpendicular to the longitudinal axis and has a diameter that is less than the diameter of the external surface of the adaptor head, the adaptor head further defining a side wall connected to the end wall and extending toward the diaphragm, wherein the side wall defines a tapered region through which are formed a plurality of gas exchange channels that extend into the cavity; and
wherein the front height of the cavity extending along the longitudinal axis from the diaphragm as far as the external surface of the end wall is less than the diameter of the adaptor head in the area of the cavity; and
wherein the glow plug adaptor is arranged recessed in the glow-plug socket from the chamber opening at a recess distance in such a way that the adaptor head rests entirely within the glow-plug socket and the recess distance, which is measured along the longitudinal axis between a central point on the external surface of the end wall and the center of the chamber opening, is greater than zero; and
wherein the glow-plug socket is defined by an inner wall and a portion of the exterior of the adaptor head located between the side wall of the adaptor head and the sealing shoulder of the adaptor head is disposed alongside and spaced apart from the inner wall by a gap, wherein the size of the gap is no more than 0.05 mm.

2. The pressure measurement apparatus according to claim 1, wherein the recess distance is less than 10 mm.

3. The pressure measurement apparatus according to claim 1, wherein the adaptor head is integrally formed from at least two parts.

4. The pressure measurement apparatus according to claim 1, wherein the proximal combustion chamber end of the adaptor head is designed in the shape of a frustum.

5. The pressure measurement apparatus according to claim 1, wherein the diaphragm of the pressure sensor is part of a piezoelectric sensor.

6. The pressure measurement apparatus according to claim 1, wherein three gas exchange channels are defined in the adaptor head.

7. The pressure measurement apparatus according to claim 6, wherein each of the gas exchange channels is disposed to extend at an angle between 30° and 90° to the longitudinal axis.

8. The pressure measurement apparatus according to claim 6, wherein each of the gas exchange channels is disposed to extend at an angle 60° to the longitudinal axis.

* * * * *